United States Patent
Iwasaki et al.

(10) Patent No.: US 11,421,727 B2
(45) Date of Patent: Aug. 23, 2022

(54) CARBURIZED SHAFT PART

(71) Applicant: NIPPON STEEL & SUMITOMO METAL CORPORATION, Tokyo (JP)

(72) Inventors: Tatsuya Iwasaki, Tokyo (JP); Koji Watari, Tokyo (JP); Hidekazu Sueno, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 839 days.

(21) Appl. No.: 16/331,468

(22) PCT Filed: Sep. 20, 2017

(86) PCT No.: PCT/JP2017/033987
§ 371 (c)(1),
(2) Date: Mar. 7, 2019

(87) PCT Pub. No.: WO2018/056333
PCT Pub. Date: Mar. 29, 2018

(65) Prior Publication Data
US 2020/0182286 A1    Jun. 11, 2020

(30) Foreign Application Priority Data

Sep. 20, 2016   (JP) .............................. JP2016-183228

(51) Int. Cl.
*F16C 3/02* (2006.01)
*C21D 1/06* (2006.01)
(Continued)

(52) U.S. Cl.
CPC .................. *F16C 3/02* (2013.01); *C21D 1/06* (2013.01); *C21D 9/28* (2013.01); *C22C 38/001* (2013.01);
(Continued)

(58) Field of Classification Search
CPC .. C21D 1/06; C21D 9/28; C22C 38/00; C22C 38/001; C22C 38/002; C22C 38/02;
(Continued)

(56) References Cited

FOREIGN PATENT DOCUMENTS

EP     2436795 A1 *  4/2012  ............... C21D 1/06
JP     2-259012 A    10/1990
(Continued)

OTHER PUBLICATIONS

International Search Report for PCT/JP2017/033987 (PCT/ISA/210) dated Dec. 26, 2017.
(Continued)

*Primary Examiner* — Jenny R Wu
(74) *Attorney, Agent, or Firm* — Birch, Stewart, Kolasch & Birch, LLP

(57) ABSTRACT

A carburized shaft part having a predetermined composition, a C content at a surface layer part of a mass % of 0.60 to 1.00%, at least one hole at an outer circumferential surface, a total volume ratio of martensite and retained austenite of 97% or more at a structure at a position of a 1 mm depth from the outer circumferential surface in an axial direction of the hole and a position of a 20 μm depth from the surface of the hole, a maximum retained austenite volume ratio (R1) of 10.0 to 30.0% at a position of a 1 mm depth from the outer circumferential surface in the axial direction of the hole and a range up to a 200 μm depth from the surface of the hole, and a retained austenite reduction ratio of 20% or more found from R1 and the retained austenite volume ratio (R2) at a position of a 1 mm depth from the outer circumferential surface in the axial direction of the hole and a position of a 20 μm depth from the surface of the hole by the formula (A): $\Delta\gamma = (R1-R)/R1 \times 100$.

5 Claims, 3 Drawing Sheets

(51) Int. Cl.
    *C21D 9/28*      (2006.01)
    *C22C 38/00*     (2006.01)
    *C22C 38/02*     (2006.01)
    *C22C 38/06*     (2006.01)
    *C22C 38/20*     (2006.01)
    *C22C 38/22*     (2006.01)
    *C22C 38/24*     (2006.01)
    *C22C 38/26*     (2006.01)
    *C22C 38/28*     (2006.01)
    *C22C 38/32*     (2006.01)
    *C22C 38/38*     (2006.01)
    *C22C 38/58*     (2006.01)
    *C23C 8/22*      (2006.01)

(52) U.S. Cl.
    CPC ............ *C22C 38/002* (2013.01); *C22C 38/02* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/58* (2013.01); *C23C 8/22* (2013.01); *F16C 2204/62* (2013.01); *F16C 2204/64* (2013.01); *F16C 2204/66* (2013.01); *F16C 2204/72* (2013.01); *F16C 2204/74* (2013.01)

(58) Field of Classification Search
    CPC ......... C22C 38/06; C22C 38/20; C22C 38/22; C22C 38/24; C22C 38/26; C22C 38/28; C22C 38/32; C22C 38/38; C22C 38/58; C22C 38/60; C22C 8/22; F16C 2204/62; F16C 2204/64; F16C 2204/66; F16C 2204/72; F16C 2204/74; F16C 3/02
    See application file for complete search history.

(56) References Cited

FOREIGN PATENT DOCUMENTS

| JP | 9-53148 A | 2/1997 |
| JP | 2005-256082 A | 9/2005 |
| JP | 2006-111962 A | 4/2006 |
| JP | 2016-183398 A | 10/2016 |
| JP | 2016-183399 A | 10/2016 |

OTHER PUBLICATIONS

Written Opinion of the International Searching Authority for PCT/JP2017/033987 (PCT/ISA/237) dated Dec. 26, 2017.
International Preliminary Report on Patentability and Written Opinion of the International Searching Authority for PCT/JP2017/033987 (Forms PCT/IB/326, PCT/IB/373, PCT/ISA/237) dated Apr. 4, 2019, with English translation of the Written Opinion.

\* cited by examiner

CARBURIZED SHAFT PART

FIELD

The present invention relates to a carburized shaft part.

BACKGROUND

A shaft part used in an automobile or industrial machine (for example, a transmission shaft) is sometimes treated to harden its surface by carburizing and quenching or induction hardening.

As the method of producing a quenched shaft part, there is for example the following method. First, a workpiece of a shape close to the final product is produced. Next, an oil hole or other hole is formed by drilling, etc., to produce a semifinished part further closer to the final product. Further, finally, the semifinished part is quenched (induction hardened or carburized and quenched) to obtain the shaft part.

Usually, a shaft part is formed with various holes including an oil hole. The area surrounding a hole is the portion which is the weakest in strength. Therefore, to enhance the strength of a shaft part having a hole, it is necessary to focus on strengthening the hole and its surroundings. A technique for enhancing the torsional fatigue strength of a shaft part is disclosed in PTL 1 and PTL 2.

PTL 1 discloses a method of producing a shaft part with a high torsional fatigue strength optimizing the components of the steel material and the carburizing time.

PTL 2 discloses a shaft excellent in fatigue resistance characterized in that a residual stress of compression at a surface layer of an oil hole is 50% to 90% of the tensile strength of the steel material and a method of improving that fatigue strength.

CITATION LIST

Patent Literature

[PTL 1] Japanese Unexamined Patent Publication No. 2005-256082
[PTL 2] Japanese Unexamined Patent Publication No. 2006-111962

SUMMARY

Technical Problem

In this regard, in recent automobiles and industrial machines, for improving the fuel efficiency, smaller size and lighter weight are being strongly demanded. In the midst of all of this, further improvement of the torsional fatigue strength and excellent static torsional strength are being demanded from shaft parts. However, in the shaft part obtained by the technique disclosed in PTL 1, hole making and improvement of strength have not been sufficiently studied and further the structure of the surface layer of the hole has not been sufficiently studied, so sometimes achieving both static torsional strength and torsional fatigue strength at high levels is difficult.

In the technique disclosed in PTL 2, an ultrasonic vibration terminal is used to strike the inside of an oil hole to introduce residual stress of compression at the surface layer of the oil hole and thereby strengthen the part of the oil hole forming the starting point of fatigue fracture of the shaft. However, with striking by an ultrasonic vibration terminal, it is difficult to perform even treatment over the entire oil hole and there is the possibility that the target strength cannot always be obtained. Furthermore, due to the insufficient study of the constituents of the steel material and structure of the surface layer, sometimes achieving both static torsional strength and torsional fatigue strength at high levels is difficult.

As a technique for strengthening an oil hole, in addition to striking the hole by an ultrasonic vibration terminal disclosed in PTL 2, treatment to improve the surface by shot peening may also be considered. However, both of these processes require different facilities and apparatuses than normal processes, and therefore are economically disadvantageous due to an increase in cost.

The present invention was made in consideration of the above situation and has as its object the provision of a carburized shaft part excellent in static torsional strength and torsional fatigue strength.

Solution to Problem

The inventors engaged in intensive studies on a carburized shaft part able to achieve both excellent static torsional strength and torsional fatigue strength. As a result, the inventors discovered that by machining a hole after carburizing and quenching, at the time of machining, the retained austenite at the surface layer part of the hole transforms to hard deformation-induced martensite and can make the hardness near the hole rise. Furthermore, the inventors found that by making the hardness near the hole rise, the formation and progression of cracks from a portion near the hole are suppressed, so the static torsional strength and torsional fatigue strength of carburized shaft part can be improved and that by making a larger amount of retained austenite transform to deformation-induced martensite at the time of machining, the static torsional strength and torsional fatigue strength of the carburized shaft part can be improved more.

Usually, to control the behavior in transformation to deformation-induced martensite at the time of machining, optimizing the machining conditions is effective. For this reason, the inventors experimented with optimization of the machining conditions so as to increase as much as possible the amount of transformation to martensite. However, with optimizing just the machining conditions, while the static torsional strength and torsional fatigue strength of the carburized shaft part are indeed improved, this does not lead to the targeted values being reached.

Therefore, the inventors took notice of the chemical constituents of the steel material (carburized shaft part) and heat treatment conditions as well to try to further improve the static torsional strength and torsional fatigue strength. As a result, they found that by employing specific steel material constituents and heat treatment conditions, deformation-induced martensite transformation more easily occurs at the time of machining and the static torsional strength and torsional fatigue strength of the carburized shaft part are remarkably improved.

In the past, it has been general practice to employ specific chemical constituents of the steel material and heat treatment conditions to control the amount of retained austenite. However, optimizing the chemical constituents of the steel material and heat treatment conditions so as to control not only the amount of retained austenite but also the behavior of deformation-induced martensite transformation at the time of machining is a novel technical idea not found up to now.

Due to the above, the inventors obtained the finding that to dramatically improve the static torsional strength and torsional fatigue strength of a carburized shaft part, rather than individually optimizing the chemical constituents of the steel material, heat treatment conditions, and machining conditions, it is desirable to optimize these conditions linked with each other organically.

Further, the inventors obtained the finding that by organically optimizing the chemical constituents, heat treatment conditions, and machining conditions of the steel material, the structure after carburizing and quenching and the structure after machining are suitably controlled and in turn a carburized shaft part improved in static torsional strength and torsional fatigue strength with a good balance is obtained. Based on the above finding, the inventors completed the invention. The gist is as follows.

[1] A carburized shaft part comprising, at a 3 mm depth from an outer circumferential surface or inside deeper than that, by mass %, C: 0.10 to 0.30%,
Si: 0.01 to 0.30%,
Mn: 0.4 to 2.0%,
P: 0.050% or less,
S: 0.005 to 0.020%,
Cr: 0.4 to 3.5%,
Al: 0.010 to 0.050%,
N: 0.005 to 0.025%,
O: 0.003% or less, and
a balance of Fe and impurities,
optionally further comprising, by mass %,
Pb: 0.5% or less,
one or more elements selected from the group consisting of V, Nb, and Ti: 0.1% or less in total content,
one or more elements selected from the group consisting of Mo: 3.0% or less and Ni: 2.5% or less,
Cu: 0 to 0.50%, and
B: 0 to 0.020%,
satisfying formula (1) and formula (2),
having a C content of a surface layer part (Cs) by mass % of 0.60 to 1.00%,
having at least one hole at the outer circumferential surface,
having a total volume ratio ($\alpha'+\gamma$) of martensite and retained austenite of 97% or more at a structure at a position of a 1 mm depth from the outer circumferential surface in an axial direction of the hole and at a position of a 20 μm depth from the surface of the hole,
having a maximum retained austenite volume ratio (R1) of 10.0 to 30.0% at a position of a 1 mm depth from the outer circumferential surface in an axial direction of the hole and in a range of up to a 200 μm depth from the surface of the hole, and
having a retained austenite reduction rate ($\Delta\gamma$) of 20% or more found by a formula (A) from the R1 and a volume ratio (R2) of retained austenite at a position of a 1 mm depth from the outer circumferential surface in an axial direction of the hole and at a position of a 20 μm depth from the surface of the hole:

$$1.54 \times C + 0.81 \times Si + 1.59 \times Mn + 1.65 \times Cr + 1.77 \times Mo + 0.63 \times Ni \geq 2.35 \quad (1)$$

$$11.3 \leq -0.1 \times Si + 15.2 \times Mn + 7.0 \times Cr + 6.7 \times Mo + 6.2 \times Ni \leq 33.8 \quad (2)$$

where, the contents (mass %) of the elements are entered in the notations of the elements in formula (1) and formula (2) and 0 is entered in the case where the elements are not included.

$$\Delta\gamma = (R1 - R2)/R1 \times 100 \quad (A)$$

[2] The carburized shaft part according to [1], wherein the R2 is 20% or less.

[3] The carburized shaft part according to [1] or [2], wherein the carburized shaft part has a plastic flow layer at the surface of the hole.

[4] The carburized shaft part according to [3], wherein the plastic flow layer has a thickness of 0.5 to 15 μm.

Advantageous Effects of Invention

According to the present invention, it is possible to obtain a carburized shaft part excellent in static torsional strength and torsional fatigue strength.

BRIEF DESCRIPTION OF DRAWINGS

FIG. 1(a) is a schematic view of a quenched material and a carburized shaft part, while FIG. 1(b) is a view showing a position of a 1 mm depth from the outer circumference of the quenched material and carburized shaft part in an axial direction of the hole and at a cross-section A-A' vertical to an axial center of the hole.

DESCRIPTION OF EMBODIMENTS

Figure 1:
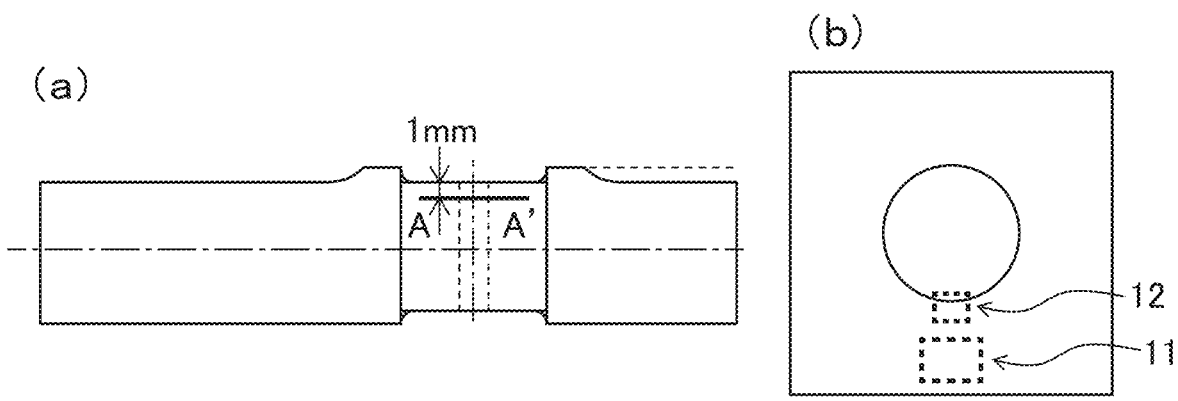

Below, referring to the drawings, a carburized shaft part according to an embodiment of the present invention will be explained in detail. Note that in the figures, the same or corresponding members will be assigned the same notations and explanations will not be repeated.

Carburized Shaft Part

A carburized shaft part according to an embodiment of the present invention is a carburized shaft part comprising, at a 3 mm depth from an outer circumferential surface or inside deeper than that, by mass %, C: 0.10 to 0.30%,
Si: 0.01 to 0.30%,
Mn: 0.4 to 2.0%,
P: 0.050% or less,
S: 0.005 to 0.020%,
Cr: 0.4 to 3.5%,
Al: 0.010 to 0.050%,
N: 0.005 to 0.025%,
O: 0.003% or less, and
a balance of Fe and impurities,
optionally further comprising, by mass %,
Pb: 0.5% or less,
one or more elements selected from the group consisting of V, Nb, and Ti: 0.1% or less in total content,
one or more elements selected from the group consisting of Mo: 3.0% or less and Ni: 2.5% or less,
Cu: 0 to 0.50%, and
B: 0 to 0.020%,
satisfying formula (1) and formula (2), having a C content of a surface layer part (Cs) by mass % of 0.60 to 1.00%, having at least one hole at the outer circumferential surface, having a total volume ratio ($\alpha'+\gamma$) of martensite and retained austenite of 97% or more at a structure at a position of a 1 mm depth from the outer circumferential surface in an axial direction of the hole and at a position of a 20 μm depth from the surface of the hole, having a maximum retained austenite volume ratio (R1) of 10.0 to 30.0% at a position of a 1 mm depth from the outer circumferential surface in an axial direction of the hole and in a range of up to a 200 μm depth from the surface of the hole, and having a retained austenite reduction rate ($\Delta\gamma$) of 20% or more found by a formula (A) from the R1 and a volume ratio (R2) of retained austenite at a position of a 1 mm depth from the outer circumferential surface in an axial direction of the hole and at a position of a 20 μm depth from the surface of the hole:

$$1.54 \times C + 0.81 \times Si + 1.59 \times Mn + 1.65 \times Cr + 1.77 \times Mo + 0.63 \times Ni \geq 2.35 \quad (1)$$

$$11.3 \leq -0.1 \times Si + 15.2 \times Mn + 7.0 \times Cr + 6.7 \times Mo + 6.2 \times Ni \leq 33.8 \quad (2)$$

where, the contents (mass %) of the elements are entered in the notations of the elements in formula (1) and formula (2) and 0 is entered in the case where the elements are not included.

$$\Delta\gamma = (R1-R2)/R1 \times 100 \quad (A)$$

The carburized shaft part according to an embodiment of the present invention includes any shaft parts having at least one oil hole or other hole at the outer circumferential surface and treated by carburization. It is not particularly limited, but for example includes shaft parts used for automobiles and industrial machines, for example, transmission shafts. Further, the carburized shaft part according to an embodiment of the present invention includes any shapes of shaft parts. While not particularly limited, it may be a hollow or solid tubular shaped or rod shaped shaft part with a diameter of about 150 mm or less, about 100 mm or less, or about 30 mm or less and a length of 5 mm or more.

Chemical Composition of Carburized Shaft Part (Essential Constituents)

The carburized shaft part has the following chemical composition. Note that the ratios (%) of the elements shown below all mean mass %. At the carburized shaft part, carbon is introduced into the surface layer part due to the carburization, so strictly speaking the surface layer part and inside part of the carburized shaft part differ in chemical composition. Therefore, the chemical composition shown below (including the essential constituents, impurities, and optional constituents) refers to the chemical composition at a region not affected by the carburizing, i.e., the 3 mm depth from the outer circumferential surface of the carburized shaft part or the inside part deeper than that, so as to match with the chemical composition of the steel material before carburizing.

C: 0.10 to 0.30%

Carbon (C) enhances the strength of the carburized shaft part (in particular the strength of the core part). C furthermore produces retained austenite for enhancing the static torsional strength and torsional fatigue strength. If the C content is too low, these effects cannot be obtained. On the other hand, if the C content is too high, the strength of the steel material for being worked to a carburized shaft part becomes too high. For this reason, the machineability of the steel material falls. Therefore, the C content is 0.10% to 0.30%. The preferable lower limit of the C content is 0.15% or more. The preferable upper limit of the C content is less than 0.25%.

Si: 0.01 to 0.30%

Silicon (Si) has the action of enhancing the hardening ability, but at the time of carburizing, ends up increasing the carburized abnormal layer. In particular, if the content exceeds 0.30%, the carburized abnormal layer greatly increases, so a soft structure called an "incompletely quenched structure" is formed and the torsional fatigue strength of the carburized shaft part falls. To prevent the formation of the carburized abnormal layer, the content of Si is preferably made 0.25% or less, more preferably is made 0.20% or less. However, in mass production, it is difficult to make the content of Si less than 0.01%. Therefore, the content of Si was made 0.01 to 0.30%. Note that if considering the producing costs in mass production, in the actually produced parts of the present invention, the Si content will probably often be 0.05% or more.

Mn: 0.4 to 2.0%

Manganese (Mn) enhances the quenching ability of steel and makes the amount of the retained austenite in the steel increase. Austenite containing Mn is more readily transformed to deformation-induced martensite compared with austenite not containing Mn at the time of machining after carburizing and quenching. As a result, the static torsional strength and torsional fatigue strength of the carburized shaft part rise. If the Mn content is too low, these effects cannot be obtained. On the other hand, if the Mn content is too high, the amount of the retained austenite becomes excessively high after carburizing and quenching and tempering. For this reason, sufficient deformation-induced martensite transformation will not occur at the time of machining, the amount of the retained austenite will become excessive even after machining, and in turn sufficient deformation-induced martensite transformation will not occur at the time of machining and the amount of the retained austenite will be hard to reduce even after machining. As a result, the static torsional strength and torsional fatigue strength of the carburized shaft part after machining will fall. Therefore, the Mn content is 0.4 to 2.0%. The preferable lower limit of the Mn content is 0.8%. The preferable upper limit of the Mn content is 1.8%.

P: 0.050% or Less

Phosphorus (P) is an impurity. P segregates at the grain boundaries and lowers the grain boundary strength. As a result, the static torsional strength and torsional fatigue strength of the carburized shaft part fall. Therefore, the P content is 0.050% or less. The preferable upper limit of the P content is 0.030%. The P content should be as low as possible. The preferable lower limit of the P content is 0.0002%.

S: 0.005 to 0.020%

Sulfur (S) bonds with Mn to form MnS and enhances the machineability. If the S content is too low, this effect cannot be obtained. On the other hand, if the S content is too high, coarse MnS are formed and the hot workability and cold workability of the steel and the torsional fatigue strength of the carburized shaft part fall. Therefore, the S content is 0.005 to 0.020%. The preferable lower limit of the S content is 0.008%. The preferable upper limit of the S content is 0.015%.

Cr: 0.4 to 3.5%

Chrome (Cr) enhances the quenching ability of steel and makes the amount of the retained austenite increase. If lowering the Cr content, these effects cannot be obtained. On the other hand, if the Cr content is too high, the amount of the retained austenite after carburizing and quenching and tempering becomes excessive. In this case, sufficient deformation-induced martensite transformation does not occur at the time of machining in the hole machining step. The amount of retained austenite is difficult to reduce even after machining. As a result, the static torsional strength and torsional fatigue strength of the carburized shaft part fall. Therefore, the Cr content is 0.4 to 3.5%. The preferable lower limit of the Cr content is 0.5%. The preferable upper limit of the Cr content is 3.1%.

Al: 0.010 to 0.050%

Aluminum (Al) deoxidizes steel. Al furthermore bonds with N to form AlN and refines the crystal grains. As a result, the static torsional strength and torsional fatigue strength of the carburized shaft part rise. If the Al content is too low, these effects cannot be obtained. On the other hand, if the Al content is too high, hard, coarse $Al_2O_3$ is formed, the machineability of the steel falls, and furthermore the torsional fatigue strength also falls. Therefore, the Al content is 0.010 to 0.050%. The preferable lower limit of the Al content is 0.020%. The preferable upper limit of the Al content is 0.040%.

N: 0.005 to 0.025%

Nitrogen (N) forms nitrides to refine the crystal grains and enhance the static torsional strength and torsional fatigue strength of the carburized shaft part. If the N content is too low, these effects cannot be obtained. On the other hand, if the N content is too high, coarse nitrides are formed and toughness of the steel falls. Therefore, the N content is 0.005 to 0.025%. The preferable lower limit of the N content is 0.010%. The preferable upper limit of the N content is 0.020%.

O: 0.003% or Less

Oxygen (O) is an impurity. O bonds with Al to form hard oxide-based inclusions. The oxide-based inclusions cause the machineability of the steel to fall and also cause the torsional fatigue strength of the carburized shaft part to fall. Therefore, the O content is 0.003% or less. As low as possible an O content the better. The preferable lower limit of the O content is 0.0001%.

The balance of the chemical composition of the carburized shaft part consists of iron (Fe) and impurities. "Impurities" mean constituents entering from the ore or scraps utilized as raw materials for the steel material or from the environment of the production process and the like and not constituents intentionally included in the carburized shaft part. Even if impurities enter the carburized shaft part, if they are trace amounts and the properties of the steel material are not detracted from, the object of the present invention can be achieved. As a specific example, the carburized shaft part according to the present invention can achieve the object of the present invention even if containing the elements shown below within the respectively stipulated ranges:

Rare earth metals (REM): 0.0005% or less,
Calcium (Ca): 0.0005% or less,
Magnesium (Mg): 0.0005% or less,
Tungsten (W): 0.001% or less,
Antimony (Sb): 0.001% or less,
Bismuth (Bi): 0.001% or less,
Cobalt (Co): 0.001% or less,
Tantalum (Ta): 0.001% or less.

Chemical Composition of Carburized Shaft Part
(Optional Constituents)

The carburized shaft part may also contain Pb in place of part of the Fe.

Pb: 0.5% or Less

Lead (Pb) is an optional element and may be included or not included. If it is included, reduction in the tool wear and improvement in the scrap disposability are achieved. However, if the Pb content is too high, the strength and toughness of the steel fall and the static torsional strength and torsional fatigue strength of the carburized shaft part fall. Therefore, the Pb content is preferably made 0.5% or less. The more preferable upper limit of the Pb content is 0.4%. Note that to obtain the above effects, the Pb content is preferably made 0.03% or more.

The carburized shaft part may also contain one or more elements selected from the group consisting of V, Nb, and Ti in place of part of the Fe.

V, Nb, and Ti: 0.1% or Less in Total Content

Vanadium (V), niobium (Nb), and titanium (Ti) are optional elements and may be included or may not be included. These elements bond with C and N to form precipitates. The precipitates of these elements assist the refinement of the crystal grains at the quenched parts formed by AlN. The precipitates of these elements enhance the static torsional strength and torsional fatigue strength of the carburized shaft part. However, if the total content of these elements exceeds 0.1%, the precipitates coarsen and the torsional fatigue strength falls. Therefore, the total content of V, Nb, and Ti is preferably 0.1% or less. If one or more of any of V, Nb, and Ti are included as optional elements, the above effect is obtained. The more preferable upper limit of the total content of V, Nb, and Ti is 0.08%. To obtain the above effect by V, Nb, and Ti, inclusion of 0.01% or more is preferable.

The carburized shaft part may furthermore also contain one or more elements selected from the group consisting of Mo and Ni instead of part of the Fe. These elements all enhance the quenching ability of the steel and increase the amount of the retained austenite.

Mo: 3.0% or Less

Molybdenum (Mo) is an optional element and need not be included. If included, Mo enhances the quenching ability of the steel and makes the amount of the retained austenite increase. Mo furthermore enhances the resistance to temper softening and enhances the static torsional strength and torsional fatigue strength of the carburized shaft part. However, if the Mo content is too high, the amount of the retained austenite after carburizing and quenching becomes excessive. In this case, sufficient deformation-induced martensite transformation does not arise at the time of machining. As a result, the static torsional strength and torsional fatigue strength of the carburized shaft part fall. Therefore, the Mo content is preferably 3.0% or less. The more preferable upper limit of the Mo content is 2.0%. To obtain the above effect by Mo, inclusion of 0.1% or more is preferable.

Ni: 2.5% or Less

Nickel (Ni) is an optional element and need not be included. If included, Ni enhances the quenching ability of the steel and increases the amount of the retained austenite. Ni further enhances the toughness of the steel. However, if the Ni content is too high, the amount of the retained austenite after carburizing and quenching becomes excessive. In this case, sufficient deformation-induced martensite transformation does not occur at the time of machining after tempering. As a result, the static torsional strength and torsional fatigue strength of the carburized shaft part fall. Therefore, the Ni content is preferably 2.5% or less. The more preferable upper limit of the Ni content is 2.0%. To obtain the above effect by Ni, inclusion of 0.1% or more is preferable.

Cu: 0 to 0.50%

Cu dissolves into a solid solution in martensite to enhance the strength of the steel material. For this reason, the fatigue strength of the steel material rises. However, if the Cu content is too high, the element segregates at the grain boundaries of the steel at the time of hot forging and induces hot cracking. Therefore, the Cu content is 0.50% or less. Note that the Cu content is preferably 0.40% or less, more preferably 0.25% or less. To obtain the above effect by Cu, inclusion of 0.10% or more is preferable.

B: 0 to 0.020%

B has the effect of suppressing the grain boundary segregation of P and enhancing the toughness. However, if adding over 0.020%, abnormal grain growth occurs at the time of carburizing and the torsional fatigue strength falls. Therefore, the B content is 0.020% or less. Note that, the B content is preferably 0.015%, more preferably 0.010% or less. To obtain the above effect by B, inclusion of 0.0005% or more is preferable.

Relationship of Contents of Elements

The relationship of contents of the elements forming the carburized shaft part satisfies the formula (1) and formula (2) shown below:

$$1.54 \times C + 0.81 \times Si + 1.59 \times Mn + 1.65 \times Cr + 1.77 \times Mo + 0.63 \times Ni \geq 2.35 \quad (1)$$

$$11.3 \leq -0.1 \times Si + 15.2 \times Mn + 7.0 \times Cr + 6.7 \times Mo + 6.2 \times Ni \leq 33.8 \quad (2)$$

where, the contents (mass %) of the elements are entered in the notations of the corresponding elements in formula (1) and formula (2) and 0 is entered when elements are not included.

Regarding Formula (1)

$F1 = 1.54 \times C + 0.81 \times Si + 1.59 \times Mn + 1.65 \times Cr + 1.77 \times Mo + 0.63 \times Ni$ is defined. F1 is a parameter showing the quenching ability of steel. If F1 is too low, the quenching ability of the steel becomes lower. In this case, low strength ferrite and pearlite are formed and the static torsional strength and torsional fatigue strength of the carburized shaft part fall. Therefore, F1 is 2.35 or more. The preferable lower limit of F1 is 3.0. For securing the toughness of the carburized shaft part, the preferable upper limit of F1 is 8.0.

Regarding Formula (2)

$F2 = -0.1 \times Si + 15.2 \times Mn + 7.0 \times Cr + 6.7 \times Mo + 6.2 \times Ni$ is defined. F2 is a parameter showing the stability of austenite. If F2 is too low, the ratio of the retained austenite obtained after carburizing and quenching becomes lower. As a result, the hardening action of the surroundings of the hole due to deformation-induced martensite transformation is not obtained while the static torsional strength and torsional fatigue strength of the carburized shaft part become lower. On the other hand, if F2 is too high, the amount of retained austenite after carburizing and quenching and tempering becomes excessive and the static torsional strength and torsional fatigue strength fall. Furthermore, the retained austenite is stable, so the ratio of deformation-induced martensite transformation obtained at the time of machining also becomes smaller. From this viewpoint as well, the static torsional strength and torsional fatigue strength of the carburized shaft part fall. Therefore, a F2 of 11.3 to 33.8 is demanded. The preferable lower limit of F2 is 12.0. The preferable upper limit of F2 is 33.0.

At Least One Hole at Outer Circumferential Surface of Carburized Shaft

The carburized shaft part according to an embodiment of the present invention has one or more through holes or non-through holes vertical to or having a certain angle with respect to the longitudinal (axial) direction of the carburized shaft part, which are opened from the outer circumferential surface of the carburized shaft part. The hole diameter is not particularly limited, but may be for example 0.2 mm to 10 mm.

C Content of Surface Layer Part (Cs): 0.60 to 1.00%

The C contained at the surface layer part of the carburized shaft part enhances the static torsional strength and torsional fatigue strength of the carburized shaft part. In the present invention, the C content of the surface layer part of the carburized shaft part is measured by the following technique.

The part of the carburized shaft part at a 1 mm depth from the outer circumferential surface in the axial direction of the hole and at 50 μm from the hole surface layer was cut out by a machining operation. The C content of the machining powder was quantitatively measured by emission spectroscopy. The value was defined as the C content of the surface layer part. Further, the C concentration of the surface layer part of the carburized shaft part can also be quantitatively analyzed by EPMA (electron beam microanalyzer).

If the C content contained at the surface layer part (Cs) is low, the carburized layer becomes lower in hardness. As a result, the carburized shaft part falls in static torsional strength. On the other hand, if (Cs) is high, hard pro-eutectoid cementite is formed at the surface layer of the carburized shaft part. If Cs is excessively high and the pro-eutectoid cementite is over 3%, the cementite becomes the starting point of cracks and the static torsional strength and torsional fatigue strength fall. Furthermore, the tool wear at the time of machining increases and the machine-ability falls. Therefore, the C content of the surface layer part (Cs) is 0.60 to 1.00%. The preferable lower limit of Cs is 0.65%. The preferable upper limit of Cs is 0.90%.

Total Volume Ratio ($\alpha'+\gamma$) of Martensite and Retained Austenite at Structure at Position of Depth of 1 mm from Outer Circumferential Surface of Carburized Shaft Part in Axial Direction of Hole and Depth of 20 μm from Surface of Hole If ferrite, pearlite, and other low strength phases are present in the structure at the position of a 1 mm depth from the outer circumferential surface of the carburized shaft part in the axial direction of the hole and at a position of a 20 μm depth from the surface of the hole, cracks easily form starting from these phases and the static torsional strength and torsional fatigue strength of the carburized shaft part become lower. Further, if pro-eutectoid cementite is present, the tool wear at the time of machining in the producing process of the carburized shaft part increases and, further, the cementite becomes the starting points of fatigue fracture, so the torsional fatigue strength falls. Therefore, the total volume ratio ($\alpha'+\gamma$) of the martensite and retained austenite in the structure at this position is limited to 97% or more. Note that the preferable range of the total volume ratio is 99% or more.

Figure 2:
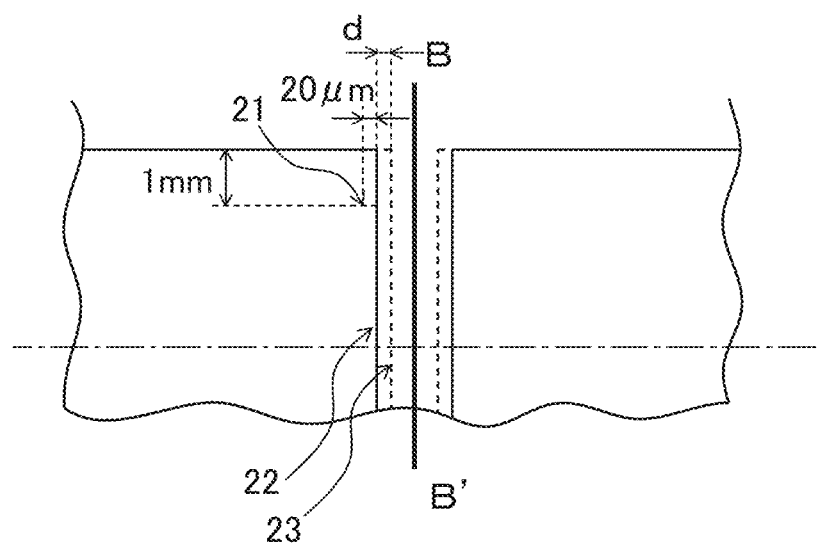
FIG. 2 is a view showing a reference position in measurement of a volume ratio of retained austenite of the carburized shaft part.

In the present invention, the total volume ratio ($\alpha'+\gamma$) of the martensite and retained austenite is measured by the following method by observing the structure at the reference position 21 corresponding to the position of a 1 mm depth from the outer circumferential surface of the carburized shaft part in an axial direction of the hole and a position of a 20 μm depth from the surface of the hole (see FIG. 2). A test piece is taken so as to include a hole surface layer part at a position of a 1 mm depth from the outer circumference of the carburized shaft part in the axial direction of the hole and at a cross-section vertical to the hole axial center and so that the surface vertical to the axial direction of the hole (horizontal cross-section) becomes the observed surface (FIG. 1A-A'). The mirror polished test piece is etched by a 5% Nital solution. The etched surface is observed at three fields by a 1000× power optical microscope. At this time, the reference position 21 is made the center of the field (FIG. 1-11). In the plane of a range of 20 μm×100 μm of 10 μm in the surface direction of the quenched material from the center of the field, 10 μm in the direction opposite to the surface of the quenched material from the center of the field, and 50 μm each in the two directions vertical to the surface direction of the quenched material from the center of the field, the area ratios of the phases are found by the usual image analysis method. The average values of the area ratios of the phases obtained for three fields are defined as the volume ratios of the phases.

Maximum Retained Astenite Volume Ratio (R1) in Range at Position of Depth of 1 mm from Outer Circumferential Surface of Carburized Shaft Part in Axial Direction of Hole and up to Depth of 200 μm from Surface of Hole The retained austenite introduced by carburizing and quenching transforms to deformation-induced martensite at the time of machining a hole in the carburized shaft part. Specifically, at the time of hole making, the frictional force between the cutting tool and base material causes part of the retained austenite near the surface layer of the hole to transform to deformation-induced martensite. On the other hand, the occurrence of deformation-induced martensite transformation due to this action becomes stronger the closer to the surface of the hole and becomes weaker the further from the surface of the hole.

As a result of the deformation-induced martensite transformation accompanying hole-making, the carburized shaft part rises in strength and the static torsional strength and torsional fatigue strength rise. To obtain such an effect, the maximum retained austenite volume ratio (R1) at a position of a 1 mm depth from the outer circumferential surface of the carburized shaft part in the axial direction of the hole and up to a 200 μm depth from the surface of the hole has to be 10.0% or more.

On the other hand, retained austenite is soft, so if the maximum retained austenite volume ratio (R1) exceeds 30.0%, conversely the static torsional strength and torsional fatigue strength of the carburized shaft part fall.

In the present invention, the maximum retained austenite volume ratio (R1) is measured by the following method. The carburized shaft part is cut in the axial direction of the hole so as to pass through the center and bisect the hole (FIG. 2B-B'). The surface of the hole is masked leaving open a hole of φ1 mm centered about a position of a 1 mm depth from the outer circumferential surface and electrolytically polished. The duration of the electrolytic polishing is changed to adjust the amount of polishing and dig a hole of a 30 μm depth. The electrolytic polishing is performed by a voltage of 20V using an electrolytic solution containing 11.6% of ammonium chloride, 35.1% of glycerin, and 53.3% of water. The electrolytically polished surface is analyzed by X-ray diffraction to find the volume ratio of retained austenite at a position 30 μm from the surface. This process is repeated to make the hole deeper by 10 μm at a time. Each time, the volume ratio of the retained austenite is measured. This is repeated until the hole depth becomes 200 μm. The maximum retained austenite volume ratio obtained during that is made (R1).

At the surface of the electrolytically polished test piece, an X-ray is fired centered on a reference position for analysis by the X-ray diffraction method. For the X-ray diffraction, a product name RINT-2500HUPC made by Rigaku is used. For the light source, a Cr tube is used. The tube voltage is 40 kV, the tube current is 40 mA, and the collimator diameter is 0.5 mm. A V-filter is used to remove the Kβ rays. Just the Kα rays are used. For data analysis, the AutoMATE software (made by Rigaku) is used. The Rachinger method is used to remove the Kα2 component and use the profile of the Kα1 component to calculate the volume ratio (R1) of retained austenite based on the ratio of integrated intensities of the diffraction peaks of the (211) face of the bcc structure and the (220) face of the fcc structure. Note that, the spot size of the irradiated X-ray is made φ0.5 mm or less.

Retained Austenite Volume Ratio (R2) at Position of Depth of 1 mm from Outer Circumferential Surface of Carburized Shaft Part in Axial Direction of Hole and at Position of Depth of 20 μm from Surface of Hole The retained austenite volume ratio (R2) at a position of a 1 mm depth from the outer circumferential surface of the carburized shaft part in the axial direction of the hole and at a position of a 20 μm depth from the surface of the hole is preferably 20% or less. If the volume ratio of the retained austenite after machining is too high, hard martensite cannot be obtained and the static torsional strength and torsional fatigue strength fall.

In the present invention, the retained austenite volume ratio (R2) is measured by the following method. The carburized shaft part is cut in the axial direction of the hole so as to pass through the center and bisect the hole (FIG. 2B-B'). The surface of the hole is masked leaving open a hole of φ1 mm centered about a position of a 1 mm depth from the outer circumferential surface and electrolytically polished. The duration of the electrolytic polishing is changed to adjust the amount of polishing and form a hole of a 20 μm depth. An X-ray of a spot size of φ0.5 mm is fired at the center of the hole and the retained austenite volume ratio (R2) is measured in the same way as the retained austenite volume ratio (R1).

Retained Austenite Reduction Ratio Δγ Found from R1 and R2 by Formula (A): $\Delta\gamma = (R1-R2)/R1 \times 100$ The retained austenite reduction ratio (Δγ) found from R1 and R2 by the above formula (A) is 20% or more.

The retained austenite reduction ratio (Δγ) shows the extent of deformation-induced martensite transformation at the time of machining. If Δγ is high, it means that a larger amount of deformation-induced martensite transformation occurs at the time of machining. The static torsional strength and torsional fatigue strength are improved. To obtain such an effect, Δγ has to be 20% or more. Note that the preferable value of Δγ is 25% or more.

Plastic Flow Layer of Hole Surface

The carburized shaft part according to an embodiment of the present invention may also have a plastic flow layer at the surface of the hole. This plastic flow layer is a layer formed by occurrence of large deformation at the surface layer part of the hole at the time of machining the hole. This plastic flow layer is hard. If the thickness is 0.5 μm or more, the static torsional strength and torsional fatigue strength of the carburized shaft part can be improved. However, the plastic flow layer is brittle, so if it is thin in thickness, a certain extent of deformation is possible, but if the thickness is over 15 μm, cracks occur and form starting points of fractures, so sometimes the torsional fatigue strength conversely falls. Furthermore, if the plastic flow layer exceeds 15 μm in thickness, sometimes the machineability falls and the load on the tool at the time of machining increases so that tool life remarkably falls. Due to the above, the thickness of the plastic flow layer of the surface layer of the carburized shaft part is preferably 0.5 to 15 μm. Note that to further improve the static torsional strength and torsional fatigue strength of the carburized shaft part, the thickness of the plastic flow layer of the surface layer of the carburized shaft part is preferably made 1 μm or more, more preferably 3 μm or more. Further, the preferable upper limit is 13 μm, more preferably 10 μm.

Figure 3:
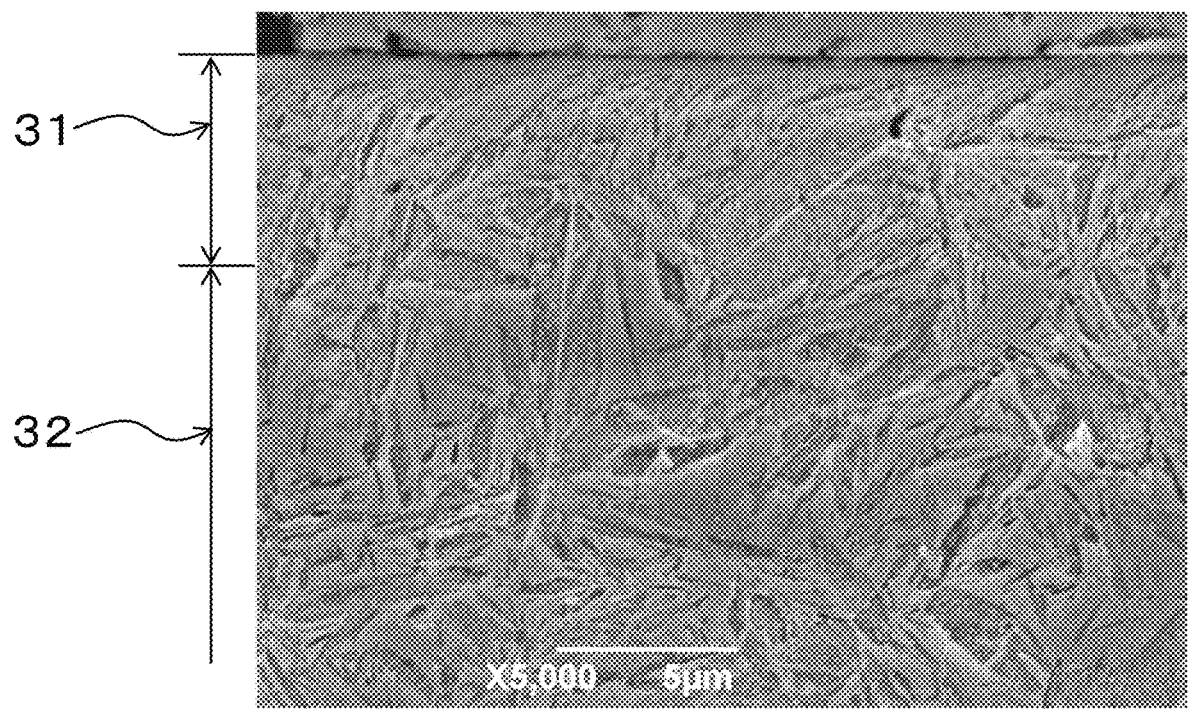
FIG. 3 is a scan electron micrograph of a surface layer of a hole at a position of a 1 mm depth from an outer circumference of the carburized shaft part in an axial direction of the hole and at a cross-section A-A' vertical to the hole.

The thickness of the plastic flow layer at the surface of the hole is measured by the following method. A test piece is taken so as to include a hole surface layer part at a position of a 1 mm depth from the outer circumference of the carburized shaft part in the axial direction of the hole and at a cross-section vertical to the hole and so that the surface vertical to the axial direction of the hole (horizontal cross-section) becomes the observed surface (FIG. 1A-A'). The mirror polished test piece is etched by a 5% Nital solution. The etched surface is observed by a 5000× power scan electron microscope (SEM). One example of the obtained SEM image is shown in FIG. 3. In the figure, the plastic flow layer 31 is the part where the structure is curved along the surface of the hole with respect to the base material 32 (from the left direction to the right direction of the paper surface at FIG. 3). The distance from the surface of the hole to the end of the curved structure is defined as the thickness of the plastic flow layer 31.

Hardened Layer of Hole Surface Layer Part

Figure 5:
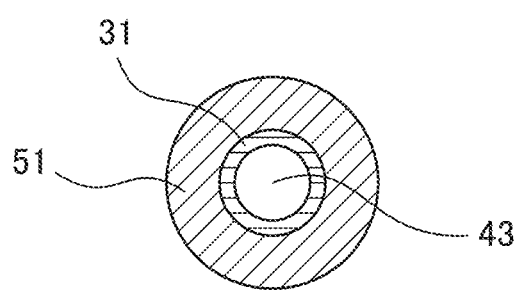
FIG. 5 is a top view of the surrounding parts of a hole in the carburized shaft part according to the present invention.

The carburized shaft part according to an embodiment of the present invention has a layer, including the above plastic flow layer, hardened from the hole surface over a certain depth. This hardened layer includes a layer formed by the retained austenite of the hole surface layer part transforming to deformation-induced martensite at the time of machining a hole (deformation-induced martensite layer) and for example has a thickness of about 200 to 300 μm. The carburized shaft part according to the present invention, as shown in FIG. 5, realizes excellent static torsional strength and torsional fatigue strength overall by providing a hardened layer including a plastic flow layer 31 and deformation-induced martensite layer 51, in particular a hard deformation-induced martensite layer 51, around a hole 43 able to become a cause of lowering the static torsional strength and torsional fatigue strength.

Method of Producing Carburized Shaft Part

The carburized shaft part according to an embodiment of the present invention can be produced by machining a hole after carburizing and quenching. For example, it can be produced by the methods shown in following Modes 1 and 2.

Mode 1

The method of producing a carburized shaft part comprises working a steel material to obtain a workpiece (workpiece producing step), carburizing and quenching the workpiece to obtain a carburized material (carburized material producing step), and machining a hole in the quenched material to obtain a carburized shaft part (hole machining step). More specifically, the method of producing the carburized shaft part comprises obtaining a workpiece by working a steel material comprising, by mass %,
C: 0.10 to 0.30%,
Si: 0.01 to 0.30%,
Mn: 0.4 to 2.0%,
P: 0.050% or less,
S: 0.005 to 0.020%,
Cr: 0.4 to 3.5%,
Al: 0.010 to 0.050%,
N: 0.005 to 0.025%,
O: 0.003% or less, and
a balance of Fe and impurities,
optionally further comprising, by mass %,
Pb: 0.5% or less,
one or more elements selected from the group consisting of V, Nb, and Ti: 0.1% or less in total content,
one or more elements selected from the group consisting of Mo: 3.0% or less and Ni: 2.5% or less,
Cu: 0 to 0.50%, and B: 0 to 0.020% satisfying formula (1) and formula (2) (workpiece producing step), carburizing, isothermally holding, and quenching the workpiece to obtain a carburized material, during which making a carburizing temperature (T1) 900° to 1050° C., a carbon potential at the time of carburizing (Cp1) 0.7% to 1.1%, a carburizing time (t1) 60 minutes or more, an isothermal holding temperature (T2) 820° C. to 870° C., a carbon potential at the time of isothermal holding (Cp2) 0.7% to 0.9% or less, and an isothermal holding time (t2) 20 to 60 minutes, so that in the carburized material, the structure at a reference position corresponding to a position of a 1 mm depth from the outer circumferential surface of the final form of the carburized shaft part in the axial direction of the hole and a position of a 20 µm depth from a position corresponding to the surface of the hole contains martensite, a volume ratio (RI) of 12.0 to 35.0% of retained austenite, and a volume ratio of 3% or less of phases other than the martensite and retained austenite (carburized material producing step), and machining a hole in the carburized material to obtain a carburized shaft part, during which making a tool feed at the time of machining over 0.01 mm/rev to 0.1 mm/rev, a machining speed 10 m/min to 50 m/min, and a depth of cut (d) 0.05 mm to 0.25 mm, so that in the structure at the reference position, the volume ratio (RF) of the retained austenite becomes 20% or less and the retained austenite reduction ratio (Δγ') found from the volume ratio (RI) of the retained austenite before machining and the volume ratio (RF) of the retained austenite after machining by the formula (B) becomes 35% or more (hole machining step):

$$1.54 \times C + 0.81 \times Si + 1.59 \times Mn + 1.65 \times Cr + 1.77 \times Mo + 0.63 \times Ni \geq 2.35 \quad (1)$$

$$11.3 \leq -0.1 \times Si + 15.2 \times Mn + 7.0 \times Cr + 6.7 \times Mo + 6.2 \times Ni \leq 33.8 \quad (2)$$

where, the contents (mass %) of the elements are entered in the notations of the elements in formula (1) and formula (2) and 0 is entered in the case where the elements are not included.

$$\Delta\gamma' = (RI - RF)/RI \times 100 \quad (B)$$

Workpiece Producing Step

In this step, a workpiece having a desired shape close to the shape of the carburized shaft part is produced. First, a steel material having the above chemical composition is prepared.

Producing of Workpiece

A steel material having the above chemical composition is worked to obtain a workpiece. For the working method, a known method can be employed. For example, the working method includes hot working, cold working, machining, etc. The workpiece has a shape similar to the carburized shaft part at the parts other than the hole. The diameter of the hole is made smaller than the diameter of the carburized shaft part. Note that, the difference between the radius of the hole of the carburized shaft part and the radius of the hole at the workpiece corresponds to the depth of cut (d) in the subsequent hole machining step.

Carburized Material Producing Step

The above obtained workpiece is carburized, isothermally held, and quenched to obtain a carburized material. Due to this, in the carburized material, the structure at the reference position 21 (see FIG. 2) at a 1 mm depth from the outer circumferential surface of the final form of the carburized shaft part in the axial direction of the hole and a position of a 20 µm depth from the position corresponding to the surface of the hole contains martensite, a volume ratio (RI) of 12.0 to 35.0% of retained austenite, and a volume ratio of 3% or less of phases other than the martensite and retained austenite.

Carburizing and Quenching

The carburizing and quenching step first performs carburizing, then performs isothermal holding. The carburizing and isothermal holding are performed under the following conditions.

Carburizing

Carburizing Temperature (T1): 900 to 1050° C. If the carburizing temperature (T1) is too low, the surface layer of the workpiece is not sufficiently carburized. In this case, there is little retained austenite after carburizing and quenching and the surface layer is also low in hardness. For this reason, the static torsional strength and torsional fatigue strength of the carburized shaft part become low. On the other hand, if the carburizing temperature (T1) is too high, the austenite grains become coarser and the static torsional strength and torsional fatigue strength of the carburized shaft part fall. Therefore, the carburizing temperature (T1) is 900 to 1050° C. The preferable lower limit of the carburizing temperature (T1) is 910° C., while the preferable upper limit is 1000° C.

Carbon Potential at Time of Carburizing (Cp1): 0.7 to 1.1%

If the carbon potential (Cp1) is too low, the material is not sufficiently carburized. In this case, there is little retained austenite after carburizing and quenching and the surface layer is also low in hardness. For this reason, the static torsional strength and torsional fatigue strength of the carburized shaft part fall. On the other hand, if the carbon potential (Cp1) is too high, the hard pro-eutectoid cementite precipitating at the time of carburizing remains in over 3% even after carburizing and quenching. In this case, cracks form starting from the pro-eutectoid cementite and the carburized shaft part falls in torsional fatigue strength. Further, the tool wear at the time of machining increases and the machineability of the carburized material falls. Therefore, the carbon potential (Cp1) is 0.7 to 1.1%. The carbon potential (Cp1) may be made to fluctuate in that range at the time of carburizing.

Carburizing Time (t1): 60 min or More

If the time of the carburizing (carburizing time) (t1) is too short, the material is not sufficiently carburized. Therefore, the carburizing time (t1) is 60 minutes or more. On the other hand, if the carburizing time (t1) is too long, the productivity falls. Therefore, the upper limit of the carburizing time (t1) is preferably made 240 minutes.

Isothermal Holding

After carburizing, the material is isothermally held. The isothermal holding is performed under the following conditions.

Isothermal Holding Temperature (T2): 820 to 870° C.

If the isothermal holding temperature (T2) is too low, control of the atmosphere such as the carbon potential becomes difficult. In this case, the volume ratio of the retained austenite is difficult to adjust. On the other hand, if the isothermal holding temperature (T2) is too high, the strain occurring at the time of quenching increases and sometimes quench cracking occurs. Therefore, the isothermal holding temperature (T2) is 820 to 870° C.

Carbon Potential at Time of Isothermal Holding (Cp2): 0.7 to 0.9%

If the carbon potential at the time of isothermal holding (Cp2) is too low, the C which entered at the time of carburizing is again discharged to the outside. In this case, there is little retained austenite after carburizing and quenching and the surface layer hardness is also low. As a result, the static torsional strength and torsional fatigue strength of the carburized shaft part fall. On the other hand, if the carbon potential (Cp2) is too high, hard pro-eutectoid cementite precipitates. In this case, cracks form starting from the pro-eutectoid cementite and the carburized shaft part falls in the torsional fatigue strength. Further, the tool wear at the time of machining increases and the carburized material falls in machineability. Therefore, the carbon potential (Cp2) is 0.7 to 0.9%.

Isothermal Holding Time (t2): 20 to 60 min

If the isothermal holding time (t2) is too short, the temperature of the workpiece will not become uniform and the strain occurring at the time of quenching increases. In this case, sometimes quench cracking occurs in the carburized material. On the other hand, if the isothermal holding time (t2) is too long, the productivity falls. Therefore, the isothermal holding time (t2) is 20 to 60 minutes.

Quenching

After isothermal holding, the known method is used for quenching. The quenching can for example be made oil quenching.

Tempering

If desiring to raise the toughness of the carburized shaft part, it is possible to perform carburizing and quenching, then perform tempering.

Structure of Carburized Material after End of Carburized Material Producing Step The structure at the reference position 21 corresponding to a position of a 1 mm depth from the outer circumferential surface of the final form of the shaft part in the axial direction of the hole and a position of a 20 μm depth from a position corresponding to the surface of the hole under the above conditions contains martensite, a volume ratio (RI) of 12.0 to 35.0% of retained austenite, and a volume ratio of 3% or less of phases other than the martensite and retained austenite.

Note that, the structure at the reference position 21 corresponding to a position of a 1 mm depth from the outer circumferential surface of the final form of the quenched material of the carburized shaft part in the axial direction of the hole and a position of a 20 μm depth from a position corresponding to the surface of the hole is observed by the following method. In the quenched material, a test piece is taken so as to include a hole surface layer part at a position of a 1 mm depth from the outer circumference of the final form of the carburized shaft part in the axial direction of the hole and at a cross-section vertical to the hole axial center and so that the surface vertical to the axial direction of the hole (horizontal cross-section) becomes the observed surface (FIG. 1A-A'). The mirror polished test piece is etched by a 5% Nital solution. The etched surface is observed at three fields by a 1000× power optical microscope. At this time, the reference position is made the center of the field (FIG. 1-11). In the plane of a range of 20 μm×100 μm of 10 μm in the surface direction of the quenched material from the center of the field, 10 μm in the direction opposite to the surface of the quenched material from the center of the field, and 50 μm each in the two directions vertical to the surface direction of the quenched material from the center of the field, the area ratios of the phases were found by the usual image analysis method. The average values of the area ratios of the phases obtained for three fields were defined as the volume ratios of the phases.

In the observation of the structure by an optical microscope, the retained austenite is included in the martensite. In other words, in observation of the structure by an optical microscope, martensite and retained austenite cannot be differentiated. Therefore, the retained austenite volume ratio (RI) at the reference position corresponding to a position of a 1 mm depth from the outer circumferential surface of the final form of the carburized shaft part in the axial direction of the hole and a position of a 20 μm depth from a position corresponding to the surface of the hole (FIG. 2-21) is measured by the following method. The carburized material is cut in the axial direction of the hole so as to pass through the center and bisect the hole (FIG. 2B-B'). The surface of the hole is masked leaving open a hole of φ1 mm centered about a position of a 1 mm depth from the outer circumferential surface and electrolytically polished. The duration of the electrolytic polishing is changed to adjust the amount of polishing and form a hole of a depth reaching the reference position. The electrolytic polishing is performed by a voltage of 20V using an electrolytic solution containing 11.6% of ammonium chloride, 35.1% of glycerin, and 53.3% of water.

At the electrolytically polished surface, an X-ray is fired centered on a reference position for analysis by the X-ray diffraction method. For the X-ray diffraction, a product name RINT-2500HL/PC made by Rigaku is used. For the light source, a Cr tube is used. The tube voltage is 40 kV, the tube current is 40 mA, and the collimator diameter is 0.5 mm. A V-filter is used to remove the Kβ rays. Just the Kα rays are used. For data analysis, the AutoMATE software (made by Rigaku) is used. The Rachinger method is used to remove the Kα2 component and use the profile of the Kα1 component to calculate the volume ratio (RI) of retained austenite based on the ratio of integrated intensities of the diffraction peaks of the (211) face of the bcc structure and the (220) face of the fcc structure. Note that, the spot size of the irradiated X-ray is made φ0.5 mm or less.

The retained austenite volume ratio (RI) at the reference position 21 corresponding to a position of a 1 mm depth from the outer circumferential surface of the final form of the carburized shaft part in the axial direction of the hole and a position of a 20 μm depth from a position corresponding to the surface of the hole is 12.0 to 35.0%. The retained austenite transforms to deformation-induced martensite at the time of machining a hole after carburizing and quenching. As explained above, in the shaft part according to the present invention, due to the deformation-induced martensite formed at the surroundings of the hole, the reduction in the static torsional strength and torsional fatigue strength of the carburized shaft part due to the presence of the hole are suppressed. If the volume ratio (RI) of the retained austenite at the position of a 1 mm depth from the outer circumferential surface is lower than 12.0%, this effect cannot be obtained. On the other hand, if the volume ratio (RI) of the retained austenite is higher than 35.0%, a large amount of soft austenite remains even after machining. For this reason, in the carburized shaft part as a whole, excellent static torsional strength and torsional fatigue strength cannot be obtained. By controlling the RI to within 12.0 to 35.0% in range, it is possible to more reliably achieve one or both of the following features in the final form of the carburized shaft part, i.e., (a) a 10.0 to 30.0% maximum retained austenite volume ratio (R1) and (b) a 20% or more retained austenite reduction ratio ($\Delta\gamma$).

The volume ratio of the phases other than martensite and retained austenite at the reference position of the carburized material (for example, ferrite, pearlite, and pro-eutectoid cementite) is 3% or less. If there is ferrite, pearlite, and other low strength phases at the reference position of the carburized material, these phases are maintained even after machining, so cracks easily form starting from these phases and the static torsional strength and torsional fatigue strength of the carburized shaft part fall. Further, if pro-eutectoid cementite is present, cracks are formed starting from the pro-eutectoid cementite and the static torsional strength and torsional fatigue strength of the carburized shaft part fall.

Hole Machining Step (Machining)

After carburizing and quenching, a hole is machined. Due to this machining, a hole is formed while causing deformation-induced martensite transformation at the surface layer. Due to this, the static torsional strength and torsional fatigue strength of the carburized shaft part rise. The machining is performed under the following conditions. Note that, as the cutting tool, for example, a cBN end mill can be used. Using a cBN end mill is effective in terms of suppressing tool wear and improving working efficiency. Further, if desiring to cut the tool cost, it is also possible to use a coated carbide drill (JIS B 0171: 2014, coated carbide drill prescribed in Nos. 1003 and 1004).

Tool Feed "f": Over 0.01 mm/rev to 0.1 mm/rev

When machining an oil hole after carburizing, the tool is made to move while rotating from the outer circumferential part of the carburized material toward the center along the oil hole. At that time, the distance by which the tool proceeds per turn is called the "tool feed 'f'". If the tool feed "f" is too slow, the machining resistance, i.e., the force by which the tool is pushed against the machined material, is too small. In this case, sufficient deformation-induced martensite transformation does not occur. For this reason, the torsional fatigue strength of the carburized shaft part is not improved. On the other hand, if the feed is too great, the machining resistance becomes too large. In this case, at the time of machining, the tool is liable to break. Therefore, the feed "f" is over 0.01 mm/rev to 0.1 mm/rev. The preferable lower limit of the feed "f" is 0.02 mm/rev. The preferable upper limit of the feed "f" is 0.08 mm/rev, more preferably 0.05.

Machining Speed "v": 10 to 50 m/min

When machining a hole after carburizing, the tool is advanced while rotating along the hole from the outer circumferential part of the carburized material toward the center. At that time, the speed by which the outer circumferential part of the tool rotates is called the "machining speed 'v'". If the machining speed "v" is too fast, the machining temperature rises and martensite transformation becomes difficult to occur. For this reason, the carburized shaft part is not improved in torsional fatigue strength. On the other hand, if the machining speed is too slow, the machining efficiency falls and the producing efficiency falls. Therefore, the machining speed "v" is 10 to 50 m/min. The preferable upper limit is 40 m/min, more preferably 30 m/min.

Depth of Cut (d): 0.05 to 0.25 mm

The depth of cut (d) is the difference between the radius of the hole of the carburized shaft part and the radius of the hole at the workpiece and corresponds to the amount of machining. If the depth of cut (d) is too low, the machining resistance becomes smaller. In this case, sufficient deformation-induced martensite transformation does not occur. For this reason, the carburized shaft part is not improved in the torsional fatigue strength. On the other hand, if the depth of cut (d) is too deep, the carburized and quenched layer becomes too thin, so the static torsional strength and torsional fatigue strength of the carburized shaft part fall. Therefore, the depth of cut (d) is 0.05 to 0.25 mm. The preferable lower limit of the depth of cut (d) is 0.08 mm, while the preferable upper limit is 0.20 mm, more preferably 0.15 mm.

Structure of Carburized Shaft Part

The hole machining step shown above is performed to obtain the carburized shaft part. At the reference position 21 of a position of a 1 mm depth from the outer circumferential surface of the carburized shaft part in the axial direction of the hole and a position of a 20 μm depth from the surface of the hole, the volume ratio (RF) of retained austenite becomes 20% or less and the retained austenite reduction ratio ($\Delta\gamma'$) before and after machining found from the retained austenite volume ratio (RI) before machining and the volume ratio (RF) of retained austenite after machining by the formula (B) becomes 35% or more.

The austenite volume ratio (RF) is measured by the following method. The carburized shaft part is cut in the axial direction of the hole and passing through the center to divide the hole into two (FIG. 2B-B'). The surface of the hole is masked leaving open a hole of φ1 mm centered about a position of a 1 mm depth from the outer circumferential surface and electrolytically polished. The duration of the electrolytic polishing is changed to adjust the amount of polishing and make a hole of a 20 μm depth. An X-ray of a spot size of φ0.5 mm is fired at the center of the hole and the retained austenite volume ratio (RF) is measured in the same way as the above-mentioned retained austenite volume ratio (RI).

Accordingly, the volume reduction ratio (Δγ') of the retained austenite before and after machining is calculated by the formula (B) based on the volume ratios (RI) and (RF) found.

Reduction ratio Δγ'=(RF−RF)/RI×100    (B)

The austenite volume ratio (RF) at a position of a 1 mm depth from the outer circumferential surface of the carburized shaft part in the axial direction of the hole and a position of a 20 μm depth from the hole surface is 20% or less. If the volume ratio of the retained austenite after machining is too high, hard martensite is not obtained and the static torsional strength and torsional fatigue strength fall.

The volume reduction ratio (Δγ') of the retained austenite before and after machining is 35% or more. Due to the machining, retained austenite transforms to deformation-induced martensite whereby the static torsional strength and fatigue strength rise. If the volume reduction ratio (Δγ') is too low, this effect cannot be sufficiently obtained. Here, the retained austenite volume ratio (RF) means the retained austenite volume ratio (R2) referred to in the section on the carburized shaft part. Further, the retained austenite reduction ratio (Δγ) found by the formula (B) is a value similar to the above-mentioned Δγ (explained in section on carburized shaft part). In each case, the extent of work-induced transformation of austenite at the time of machining a hole in the step of producing a carburized shaft part is shown. Therefore, the higher the Δγ, the higher Δγ' also becomes.

In the producing method of the Mode 1, as explained above, a pilot hole smaller in diameter than the final hole diameter was formed in the workpiece producing step, then carburizing and quenching was performed in the next carburized material producing step. Therefore, according to the producing method of the Mode 1, it is possible to use this carburizing and quenching to harden the pilot hole surface layer part close to the outer circumferential surface of the shaft part relatively easily. As a result, the retained austenite of the hole surface layer part near the outer circumferential surface can be reliably transformed to hard deformation-induced martensite in the final hole machining step. For this reason, according to the producing method of the Mode 1, the formation and progression of cracks from locations near a hole are suppressed, so it is possible to produce a carburized shaft part excellent in static torsional strength and torsional fatigue strength.

Mode 2

The carburized shaft part according to an embodiment of the present invention differs from the case of the Mode 1 and can also be produced by performing carburizing and quenching without making a pilot hole in the steel material, then machining a hole. However, in this case, compared with the case of making a pilot hole, the time of the carburizing, i.e., the carburizing time (t1), has to be made longer than the case of the Mode 1 so that the material is reliably carburized up to a deeper position of the steel material. Therefore, according to the Mode 2, the carburizing time (t1) is 300 minutes or more, for example, is preferably 300 to 900 minutes. This is because if t1 is less than 300 minutes, sufficient carburizing is not performed. Note that, the other conditions in carburizing and quenching, i.e., the quenching temperature (T1), carbon potential at the time of carburizing (Cp1), isothermal holding temperature (T2), carbon potential at the time of isothermal holding (Cp2), and isothermal holding time (t2) may be suitably determined in the ranges described above for the Mode 1. Further, the tool feed and machining speed at the time of machining in the hole machining step may also be suitably determined in the ranges described in relation to the Mode 1. The Mode 2 does not require making a pilot hole, so is advantageous in that the step is simpler than the Mode 1. However, the Mode 2, as explained above, requires an extremely long carburizing time (t1). Therefore, from the viewpoint of productivity, it is preferable to use the producing method of the Mode 1 to produce the carburized shaft part according to an embodiment of the present invention.

Below, examples will be used to explain the present invention in more detail, but the present invention is not limited to these examples in any way. In the tables shown below, asterisks are attached to fields not satisfying the requirements of the present invention and fields not satisfying the desirable producing conditions of the present invention.

EXAMPLES

A vacuum melting furnace was used to obtain 150 kg amounts of molten steels A to T having the chemical compositions shown in Table 1.

TABLE 1

| Steel type | Chemical composition (unit: mass %, balance of Fe and impurities) | | | | | | | | | | | | | | | | | | |
|---|---|---|---|---|---|---|---|---|---|---|---|---|---|---|---|---|---|---|---|
| | C | Si | Mn | P | S | Cr | Al | N | O | Pb | V | Nb | Ti | Mo | Ni | Cu | B | F1 | F2 |
| A | 0.21 | 0.09 | 1.54 | 0.013 | 0.010 | 0.50 | 0.032 | 0.015 | 0.002 | — | — | 0.08 | — | — | — | — | — | 3.67 | 26.9 |
| B | 0.21 | 0.21 | 1.53 | 0.016 | 0.010 | 0.51 | 0.030 | 0.017 | 0.001 | — | — | — | — | — | — | — | — | 3.77 | 26.8 |
| C | 0.19 | 0.10 | 1.98 | 0.011 | 0.011 | 0.41 | 0.032 | 0.016 | 0.002 | — | — | — | — | — | — | — | — | 4.20 | 33.0 |
| D | 0.22 | 0.11 | 0.82 | 0.015 | 0.011 | 1.18 | 0.030 | 0.015 | 0.002 | — | — | — | — | 0.19 | — | — | — | 3.97 | 22.0 |
| E | 0.21 | 0.10 | 0.81 | 0.016 | 0.010 | 1.20 | 0.032 | 0.017 | 0.001 | — | — | — | — | — | — | — | — | 3.67 | 20.7 |
| F | 0.18 | 0.10 | 0.80 | 0.015 | 0.010 | 1.20 | 0.038 | 0.016 | 0.003 | — | — | — | — | 0.20 | 0.50 | — | — | 4.28 | 25.0 |
| G | 0.21 | 0.11 | 0.80 | 0.011 | 0.009 | 1.86 | 0.033 | 0.017 | 0.001 | — | — | — | — | 0.19 | — | — | — | 5.09 | 26.4 |
| H | 0.24 | 0.10 | 0.80 | 0.012 | 0.011 | 0.81 | 0.031 | 0.013 | 0.001 | — | — | — | — | — | — | — | — | 3.06 | 17.8 |
| I | 0.18 | 0.11 | 1.55 | 0.013 | 0.010 | 0.50 | 0.035 | 0.015 | 0.001 | — | 0.06 | — | 0.02 | — | — | — | — | 3.66 | 27.1 |
| J | 0.18 | 0.11 | 1.54 | 0.013 | 0.010 | 0.50 | 0.033 | 0.016 | 0.002 | 0.40 | — | — | — | — | — | — | — | 3.64 | 26.9 |
| K | 0.20 | 0.10 | 0.59 | 0.015 | 0.009 | 3.10 | 0.032 | 0.015 | 0.002 | — | — | — | — | — | — | — | — | 6.44 | 30.7 |
| *L | *0.09 | 0.20 | 1.55 | 0.012 | 0.009 | 1.21 | 0.033 | 0.013 | 0.002 | — | — | — | — | — | — | — | — | 4.76 | 32.0 |
| *M | 0.20 | *0.40 | 1.55 | 0.016 | 0.010 | 0.50 | 0.032 | 0.017 | 0.001 | — | — | — | — | — | — | — | — | 3.92 | 27.0 |
| *N | 0.23 | 0.09 | 1.61 | 0.012 | 0.011 | 1.21 | 0.031 | 0.015 | 0.002 | — | — | — | — | 0.19 | — | — | — | 5.32 | *34.2 |
| *O | 0.19 | 0.09 | *2.21 | 0.010 | 0.009 | 1.20 | 0.031 | 0.017 | 0.002 | — | — | — | — | 0.20 | — | — | — | 6.21 | *43.3 |
| *P | 0.21 | 0.11 | 0.61 | 0.011 | 0.010 | 0.50 | 0.031 | 0.015 | 0.001 | — | — | — | — | — | — | — | — | *2.21 | 12.8 |

TABLE 1-continued

| Steel type | Chemical composition (unit: mass %, balance of Fe and impurities) | | | | | | | | | | | | | | | | | |
|---|---|---|---|---|---|---|---|---|---|---|---|---|---|---|---|---|---|---|
| | C | Si | Mn | P | S | Cr | Al | N | O | Pb | V | Nb | Ti | Mo | Ni | Cu | B | F1 | F2 |
| *Q | 0.19 | 0.11 | *0.30 | 0.010 | 0.009 | 1.80 | 0.030 | 0.015 | 0.003 | — | — | — | — | — | — | — | — | 3.83 | 17.2 |
| *R | 0.28 | 0.23 | 0.41 | 0.013 | 0.010 | 0.50 | 0.032 | 0.015 | 0.001 | — | — | — | — | 0.20 | — | — | — | 2.45 | *11.0 |
| S | 0.18 | 0.10 | 0.80 | 0.013 | 0.010 | 1.20 | 0.038 | 0.016 | 0.003 | — | — | — | — | — | — | 0.10 | — | 4.28 | 25.0 |
| T | 0.21 | 0.11 | 0.80 | 0.011 | 0.009 | 1.85 | 0.033 | 0.017 | 0.001 | — | — | — | — | — | — | — | 0.010 | 5.09 | 26.4 |

Molten steels of various types of steel were used to obtain ingots by the ingot casting method. Each ingot was heated at 1250° C. for 4 hours, then was hot forged to obtain a diameter 35 mm round bar. The finishing temperature at the time of hot forging was 1000° C.

Each round bar was normalized. The normalization temperature was 925° C., while the normalization time was 2 hours. After normalization, the round bar was allowed to cool to room temperature (25° C.).

Figure 4:
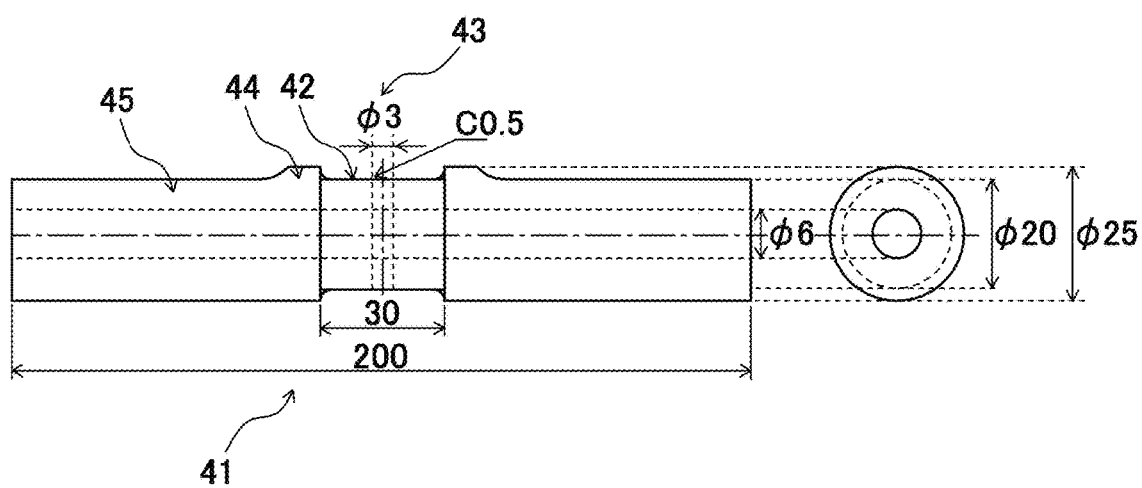
FIG. 4 is a side view of a test piece used for a torsion test.

After being allowed to cool, the round bar was machined to produce a workpiece forming the basis for the torsion test piece 41 shown in FIG. 4. If making a pilot hole before carburizing and quenching in accordance with the method of the above Mode 1, in the state of the workpiece, the diameter of the hole is smaller than 3 mm. The torsion test piece 41 corresponding to the carburized shaft part is circular in horizontal cross-section and is provided with a columnar test part 42, a hole 43 arranged at the center of the test part 42, columnar large diameter parts 44 arranged at the two sides, and a pair of grip parts 45 obtained by beveling the circumferences of the large diameter parts. Furthermore, for lightening the weight, the center part of the test piece is the hollow hole 46. As shown in FIG. 4, the overall length of the torsion test piece 41 is 200 mm, the outside diameter of the test part 42 is 20 mm, the length of the test part 42 is 30 mm, the diameter of the hole 43 is 3 mm, and the diameter of the hollow hole 46 is 6 mm.

The workpiece of the torsion test piece 41 was carburized and quenched based on the conditions shown in Table 2.

TABLE 2

| Heat treatment conditions | Cp1 (mass %) | Cp2 (mass %) | T1 (° C.) | T2 (° C.) | t1 (min) | t2 (min) |
|---|---|---|---|---|---|---|
| a | 1.0 | 0.8 | 950 | 850 | 180 | 30 |
| b | 0.9 | 0.8 | 1000 | 830 | 160 | 60 |
| c | 1.1 | 0.8 | 930 | 830 | 120 | 30 |
| d | 1.0 | 0.8 | 1000 | 850 | 600 | 30 |
| *e | *0.6 | 0.7 | 930 | 830 | 180 | 30 |
| *f | 1.0 | *1.0 | 930 | 830 | 180 | 30 |
| *g | 1.0 | *0.5 | 930 | 830 | 180 | 30 |
| *h | 1.0 | 0.8 | 930 | 830 | *30 | 30 |

After carburizing and quenching, the workpiece was tempered at 180° C. for 30 minutes.

The thickness of the carburized and quenched layer formed by carburizing and quenching and tempering of the heat treatment condition "a" of Table 2 using the Steel Type D of Table 1 was about 1.0 mm from the measured values of the distance from the surface (thickness) and the Vickers hardness (HV).

Observation of Structure of Carburized Material

The structure of the reference position 21 corresponding to a position of a 1 mm depth from the outer circumferential surface of the final form of the carburized material of the carburized shaft part in the axial direction of the hole and a position of a 20 μm depth from the position corresponding to the surface of the hole was observed by the following method. A test piece was taken so as to include a hole surface layer part at a position of a 1 mm depth from the outer circumference of the test piece (torsion test piece 41) corresponding to the final form of the shaft part in the quenched material in the axial direction of the hole and at a cross-section vertical to the hole axial center and so that the surface vertical to the axial direction of the hole (horizontal cross-section) becomes the observed surface (see numeral 12 of FIG. 1). The mirror polished test piece was etched by a 5% Nital solution. The etched surface was observed at three fields by a 1000× power optical microscope. At this time, the reference position was made the center of the field. In the plane of a range of 20 μm×100 μm of 10 μm in the surface direction of the quenched material from the center of the field, 10 μm in the direction opposite to the surface of the quenched material from the center of the field, and 50 μm n each in the two directions vertical to the surface direction of the quenched material from the center of the field, the area ratios of the phases were found by the usual image analysis method. The average values of the area ratios of the phases obtained for three fields were defined as the volume ratios of the phases.

Measurement of Volume Ratio (RI) of Retained Austenite

In the quenched material, the austenite volume ratio (RI) at the reference position 21 corresponding to a position of a 1 mm depth from the outer circumferential surface of the test piece corresponding to the final form of the shaft part (torsion test piece 51) in the axial direction of the hole and a position of a 20 μm depth from the position corresponding to the surface of the hole is measured by the following method. The carburized material was cut in the axial direction of the hole so as to pass through the center and bisect the hole (FIG. 2). The surface of the hole was masked leaving open a hole of φ1 mm centered about a position of a 1 mm depth from the outer circumferential surface and electrolytically polished. The duration of the electrolytic polishing was changed to adjust the amount of polishing and dig a hole of a depth reaching the reference position. The electrolytic polishing was performed by a voltage of 20V using an electrolytic solution containing 11.6% of ammonium chloride, 35.1% of glycerin, and 53.3% of water.

At the electrolytically polished surface, an X-ray was fired centered on a reference position for analysis by the X-ray diffraction method. For the X-ray diffraction, a product name RINT-2500HL/PC made by Rigaku is used. For the light source, a Cr tube is used. The tube voltage is 40 kV, the tube current is 40 mA, and the collimator diameter is 0.5 mm. A V-filter was used to remove the Kβ rays. Just the Kα rays were used. For data analysis, the AutoMATE software (made by Rigaku) was used. The Rachinger method was used to remove the Kα2 component and use the profile of the Kα1 component to calculate the volume ratio (RI) of retained austenite based on the ratio of integrated intensities of the diffraction peaks of the (211) face of the bcc structure and the (220) face of the fcc structure. Note that, the spot size of the irradiated X-ray is made φ0.5 mm or less.

The torsion test piece 41 of the carburized material was machined to make a hole under the conditions shown in Table 3 to obtain a torsion test piece 41 corresponding to a carburized shaft part. Note that, in Table 3, the machining conditions α, β, γ, ε, ζ, and η mean forming a pilot hole in the steel material and performing carburizing and quenching, then machining a hole under conditions of the tool feed "f" and machining speed "v" shown in Table 3. On the other hand, the machining condition δ means performing carburizing and quenching without forming a pilot hole in the steel material, then machining a hole under conditions of the tool feed "f" and machining speed "v" shown in Table 3, while the machining condition θ means performing carburizing and quenching after forming a pilot hole in the steel material, then not machining a hole.

TABLE 3

| Machining conditions | Tool feed "f" (mm/rev) | Machining speed "v" (m/min) | Depth of cut "d" (mm) |
| --- | --- | --- | --- |
| α | 0.04 | 10 | 0.1 |
| β | 0.1 | 10 | 0.05 |
| γ | 0.06 | 20 | 0.2 |
| δ | 0.04 | 10 | No pilot hole |
| *ε | *0.005 | 20 | 0.1 |
| *ζ | 0.04 | *55 | 0.1 |
| *η | 0.04 | 10 | *0.03 |
| *θ | No hole cutting after carburizing (d = 0) | | |

When machining the hole, for the cutting tool, a coated carbide drill of a diameter of 3 mm comprised of a carbide alloy coated on the surface with a ceramic was utilized. Further, for beveling, the tip part of a diameter 6 mm coated carbide drill with a tip angle of 90° was used.

Further, a shaft part in which a hole was made in the above way was used as the torsional test piece 41.

The Vickers hardness near the surface of the hole formed using the Steel Type D of Table 1 by the heat treatment condition "a" of Table 2 and the machining condition α of Table 3 was about 900 HV at a location of a distance of 10 µm from the hole surface in the depth direction, about 890 HV at a location of 20 µm, about 860 HV at a location of 40 µm, about 820 HV at a location of 50 µm, about 770 HV at a location of 100 µm, and about 740 HV at a location of 300 µm.

Measurement of Volume Ratio of Retained Austenite (R2, RF)

The carburized shaft part was cut in the axial direction of the hole of the test piece corresponding to the carburized shaft part (torsional test piece 41) and passing through the center to bisect the hole (FIG. 2). The surface of the hole was masked leaving open a hole of φ1 mm centered about a position of a 1 mm depth from the outer circumferential surface and electrolytically polished. The duration of the electrolytic polishing was changed to adjust the amount of polishing and form a hole of a 20 µm depth.

At the surface of the hole, X-ray diffraction was performed by the above method. The volume ratio (R2, RF) of the retained austenite at a position of a 1 mm depth from the outer circumferential surface and a position of a 20 µm depth from the surface of the hole was found.

Measurement of Volume Ratio (R1) of Retained Austenite

The maximum retained austenite volume ratio (R1) in a range at a position of a 1 mm depth from the outer circumferential surface of the test piece corresponding to the carburized shaft part (torsion test piece 41) in the axial direction of the hole and up to a 200 µm depth from the surface of the hole was measured by the following method. The carburized material was cut in the axial direction of the hole so as to pass through the center and bisect the hole (FIG. 2). The surface of the hole was masked leaving open a hole of φ1 mm centered about a position of a 1 mm depth from the outer circumferential surface and electrolytically polished. The duration of the electrolytic polishing was changed to adjust the amount of polishing and dig a hole of a 30 µm depth. The surface was analyzed by X-ray diffraction by the above method to find the volume ratio of retained austenite at a position 30 µm from the surface. This process was repeated to make the hole deeper by 10 µm at a time. Each time, the volume ratio of the retained austenite was measured. This was repeated until the hole depth became 200 µm. The maximum retained austenite volume ratio obtained during that was made (R1).

Static Torsion Test (Measurement of Static Torsional Strength)

The torsion test piece 41 shown in FIG. 4 was used for a torsion test by a Servopulser series torsion testing machine to obtain the relationship of the stress and torsion angle. Next, the maximum shear stress τ at which the stress and torsion maintain a proportional relationship, the so-called "proportional limit", was defined as the static torsional strength. This proportional limit corresponds to the yield stress in a tensile test. In this test, the case of a static torsional strength of 520 MPa or more was defined as "passed" in the point of having a better static torsional strength than the prior art.

Torsional Fatigue Test (Measurement of Torsional Fatigue Strength)

The torsion test piece 41 shown in FIG. 4 was used for a push-pull torsion fatigue test with a load maximum shear stress τ changed at a 50 MPa pitch and a repetition frequency of 4 Hz. Further, the midpoint between the minimum value ($\tau_{f,min}$) of the maximum shear stress of breakage before reaching $10^5$ repetitions and the maximum shear stress ($\sigma_{r,max}$) at the maximum point of nonbreakage by a stress lower than ($\tau_{f,min}$) was made the fatigue limit. Note that, for the test machine, the Servopulser series torsion testing machine was used. In this test, if the torsional fatigue strength is 375 MPa or more, the part has excellent torsional fatigue strength compared with the prior art, so is judged to have passed.

Test Results

The results of the various tests explained above are shown in Table 4 and Table 5.

TABLE 4

(Examples)

| No. | Steel type | Heat treat. cond. | Machining cond. | α' + γ am't (%) | Cs (%) | R1 (%) | Retained γ am't R2, RF (%) | Δγ (%) | Retained γ am't RI (%) | Δγ' (%) | Plastic flow layer thickness (μm) | Static torsional strength (MPa) | Torsional fatigue strength (MPa) |
|---|---|---|---|---|---|---|---|---|---|---|---|---|---|
| 1 | A | a | α | 100 | 0.79 | 20.2 | 13.2 | 34.7 | 24.2 | 45.5 | 4.0 | 574 | 475 |
| 2 | B | a | α | 100 | 0.78 | 20.1 | 13.0 | 35.3 | 23.9 | 45.6 | 4.2 | 569 | 475 |
| 3 | C | a | α | 100 | 0.76 | 26.1 | 18.1 | 30.7 | 30.8 | 41.2 | 4.5 | 547 | 475 |
| 4 | D | a | α | 100 | 0.79 | 20.0 | 14.6 | 27.1 | 23.2 | 37.1 | 3.9 | 578 | 425 |
| 5 | E | a | α | 100 | 0.80 | 18.3 | 13.2 | 27.9 | 21.2 | 37.9 | 3.8 | 587 | 425 |
| 6 | F | a | α | 100 | 0.80 | 21.1 | 15.3 | 27.5 | 24.5 | 37.5 | 4.0 | 583 | 425 |
| 7 | G | a | α | 100 | 0.82 | 25.0 | 17.7 | 29.2 | 29.1 | 39.2 | 3.4 | 601 | 425 |
| 8 | H | a | α | 100 | 0.78 | 15.2 | 10.4 | 31.3 | 17.7 | 41.3 | 4.2 | 569 | 425 |
| 9 | I | a | α | 100 | 0.77 | 20.4 | 13.2 | 35.6 | 24.2 | 45.6 | 4.3 | 552 | 475 |
| 10 | J | a | α | 100 | 0.77 | 20.8 | 13.6 | 34.6 | 24.5 | 44.6 | 4.3 | 556 | 475 |
| 11 | K | a | α | 100 | 0.84 | 23.5 | 16.5 | 29.8 | 28.8 | 42.7 | 3.7 | 615 | 475 |
| 12 | A | b | α | 100 | 0.75 | 19.9 | 12.8 | 35.7 | 23.6 | 45.8 | 4.3 | 538 | 425 |
| 13 | A | c | α | 100 | 0.81 | 19.9 | 13.7 | 31.2 | 25.0 | 45.2 | 3.7 | 596 | 475 |
| 14 | A | a | β | 100 | 0.79 | 20.3 | 15.4 | 24.1 | 24.1 | 36.1 | 2.5 | 574 | 425 |
| 15 | A | a | γ | 100 | 0.79 | 20.2 | 12.2 | 39.6 | 24.2 | 49.6 | 9.5 | 581 | 475 |
| 16 | B | b | β | 100 | 0.74 | 19.3 | 14.8 | 23.3 | 23.4 | 36.8 | 2.7 | 530 | 375 |
| 17 | B | c | γ | 100 | 0.81 | 20.5 | 12.0 | 41.5 | 24.3 | 50.6 | 11.8 | 596 | 475 |
| 18 | D | b | β | 100 | 0.77 | 19.0 | 14.0 | 26.3 | 22.8 | 38.6 | 3.0 | 556 | 375 |
| 19 | D | b | γ | 100 | 0.77 | 19.0 | 11.2 | 41.1 | 22.8 | 50.9 | 10.9 | 561 | 475 |
| 20 | D | c | β | 100 | 0.82 | 20.3 | 15.1 | 25.6 | 23.7 | 36.3 | 2.6 | 598 | 425 |
| 21 | F | b | γ | 100 | 0.78 | 19.4 | 12.6 | 35.1 | 24.0 | 47.5 | 12.3 | 569 | 475 |
| 22 | G | c | γ | 100 | 0.84 | 23.8 | 15.8 | 33.6 | 29.3 | 46.1 | 10.0 | 621 | 525 |
| 23 | I | c | γ | 100 | 0.80 | 19.9 | 12.7 | 36.2 | 24.5 | 48.2 | 9.8 | 587 | 475 |
| 24 | A | d | α | 100 | 0.80 | 24.0 | 13.8 | 42.5 | 24.4 | 43.4 | 4.1 | 635 | 525 |
| 25 | D | d | β | 100 | 0.80 | 23.5 | 15.1 | 35.7 | 23.5 | 35.7 | 2.6 | 629 | 525 |
| 26 | D | d | δ | 100 | 0.80 | 23.5 | 13.5 | 42.6 | 23.5 | 42.6 | 3.9 | 632 | 475 |
| 27 | S | a | α | 100 | 0.80 | 21.2 | 15.3 | 27.8 | 24.7 | 38.1 | 3.9 | 581 | 425 |
| 28 | T | a | α | 100 | 0.82 | 25.0 | 17.7 | 29.2 | 29.3 | 39.6 | 3.4 | 605 | 425 |

TABLE 5

(Comparative Examples)

| No. | Steel type | Heat treat. cond. | Machining cond. | α' + γ am't (%) | Cs (%) | R1 (%) | Retained γ am't R2, RF (%) | Δγ (%) | Retained γ am't RI (%) | Δγ' (%) | Plastic flow layer thickness (μm) | Static torsional strength (MPa) | Torsional fatigue strength (MPa) |
|---|---|---|---|---|---|---|---|---|---|---|---|---|---|
| * 1 | * L | a | α | 100 | 0.75 | 19.1 | 14.3 | 25.1 | 26.9 | 46.8 | 3.9 | * 478 | * 225 |
| * 2 | * M | a | α | 100 | 0.76 | 20.9 | 13.6 | 35.0 | 24.7 | 44.9 | 3.8 | 545 | * 275 |
| * 3 | * N | a | α | 100 | 0.79 | * 30.4 | * 23.2 | 23.7 | * 35.9 | 35.4 | 3.5 | * 493 | * 275 |
| * 4 | * O | a | α | 100 | 0.76 | * 34.5 | * 31.0 | * 10.1 | * 46.1 | * 32.8 | 3.8 | * 482 | * 275 |
| * 5 | * P | a | α | * 92 | 0.78 | 11.2 | 8.3 | 26.4 | 13.0 | 36.4 | 3.6 | * 489 | * 225 |
| * 6 | * Q | a | α | 100 | 0.82 | 15.7 | 13.0 | * 17.2 | 17.8 | * 27.0 | 3.2 | * 497 | * 275 |
| * 7 | * R | a | α | 100 | 0.76 | * 9.6 | 7.3 | 24.0 | * 11.4 | 36.0 | 3.8 | * 482 | * 225 |
| * 8 | A | * e | α | 100 | * 0.56 | * 8.8 | 6.3 | 28.4 | * 10.5 | 40.0 | 5.8 | * 406 | * 225 |
| * 9 | A | * f | α | * 95 | * 1.03 | 21.6 | 15.4 | 28.7 | 25.2 | 38.9 | 3.1 | * 488 | * 275 |
| * 10 | A | * g | α | 100 | * 0.58 | 15.3 | 11.3 | 26.1 | 18.5 | 38.9 | 5.6 | * 413 | 375 |
| * 11 | A | * h | α | 100 | 0.63 | * 9.4 | 8.2 | * 12.8 | 16.4 | 50.0 | 5.1 | * 432 | * 175 |
| * 12 | A | a | * ε | 100 | 0.79 | 20.8 | 18.9 | * 9.1 | 24.2 | * 21.9 | * 0.4 | * 494 | * 275 |
| * 13 | A | a | * ζ | 100 | 0.78 | 20.3 | 17.6 | * 13.3 | 24.2 | * 27.3 | 8.1 | * 489 | * 275 |
| * 14 | A | a | * η | 100 | 0.79 | 20.7 | 19.9 | * 3.9 | 24.3 | * 18.1 | * 0.3 | * 493 | * 275 |
| * 15 | A | a | * θ | 100 | 0.79 | 24.3 | * 24.3 | * 0.0 | 24.3 | * 0.0 | * 0.0 | * 494 | * 225 |
| * 16 | B | * e | α | 100 | * 0.55 | * 8.7 | 6.2 | 28.7 | * 10.4 | 40.4 | 5.9 | * 398 | * 225 |
| * 17 | B | a | * ε | 100 | 0.78 | 20.3 | 17.8 | * 12.3 | 23.8 | * 25.2 | * 0.3 | * 489 | * 275 |
| * 18 | B | b | * θ | 100 | 0.77 | 23.4 | * 23.4 | * 0.0 | 23.4 | * 0.0 | * 0.0 | * 486 | * 225 |
| * 19 | D | * f | α | * 94 | * 1.03 | 21.1 | 14.2 | 32.7 | 24.9 | 43.0 | 1.1 | * 479 | * 275 |
| * 20 | D | a | * ζ | 100 | 0.79 | 20.3 | 18.0 | * 11.3 | 23.2 | * 22.4 | 3.5 | * 493 | * 275 |
| * 21 | F | * g | α | 100 | * 0.58 | 15.3 | 11.3 | 26.1 | 18.6 | 39.2 | 5.6 | * 413 | 375 |
| * 22 | F | a | * η | 100 | 0.80 | 21.9 | * 20.7 | * 5.5 | 24.5 | * 15.5 | 3.4 | * 497 | * 275 |
| * 23 | I | * h | α | 100 | 0.65 | * 9.3 | 8.2 | * 11.8 | 16.5 | 50.3 | 4.9 | * 440 | * 175 |
| * 24 | I | a | * θ | 100 | 0.77 | 24.2 | * 24.2 | * 0.0 | 24.2 | * 0.0 | * 0.0 | * 486 | * 225 |
| * 25 | * L | b | β | 100 | 0.75 | 20.3 | 15.7 | 22.7 | 25.9 | 39.4 | 2.9 | * 478 | * 225 |
| * 26 | * M | b | γ | 100 | 0.76 | 20.9 | 13.3 | 36.5 | 24.2 | 45.0 | 9.9 | 550 | * 275 |

TABLE 5-continued (Comparative Examples)

| No. | Steel type | Heat treat. cond. | Machining cond. | α' + γ am't (%) | Cs (%) | R1 (%) | Retained γ am't R2, RF (%) | Δγ (%) | Retained γ am't RI (%) | Δγ' (%) | Plastic flow layer thickness (μm) | Static torsional strength (MPa) | Torsional fatigue strength (MPa) |
|---|---|---|---|---|---|---|---|---|---|---|---|---|---|
| * 27 | * N | b | β | 100 | 0.79 | * 30.4 | * 22.5 | 26.0 | * 35.4 | 36.4 | 2.8 | * 493 | * 225 |
| * 28 | * O | b | γ | 100 | 0.76 | * 34.5 | * 30.1 | * 12.8 | * 45.8 | * 34.3 | 9.4 | * 482 | * 275 |
| * 29 | * P | c | β | * 93 | 0.79 | 11.2 | 8.3 | 26.4 | 13.5 | 38.8 | 2.8 | * 491 | * 225 |
| * 30 | * Q | c | γ | 100 | 0.83 | 15.4 | 12.6 | * 18.2 | 18.1 | * 30.4 | 10.5 | * 509 | * 275 |
| * 32 | * R | c | β | 100 | 0.77 | * 9.6 | 7.4 | 22.9 | * 11.6 | 36.2 | 3.1 | * 487 | * 225 |
| * 32 | A | d | * ε | 100 | 0.80 | 24.0 | * 22.7 | * 5.4 | 24.1 | * 5.8 | * 0.2 | 565 | * 275 |
| * 33 | D | c | δ | 100 | 0.60 | * 8.5 | 4.2 | 50.6 | * 10.9 | 61.5 | 6.1 | * 395 | * 225 |

As clear from Table 4, it is proved that, in the carburized shaft part of the embodiments according to the present invention, by adjusting the chemical composition (including C content of surface layer part) and predicated on this, in particular controlling the RI corresponding to the retained austenite volume ratio of the hole surface layer part before machining to a predetermined range while making the retained austenite transform to deformation-induced martensite so that after machining, the reduction ratio Δγ' becomes a predetermined ratio or more, it is possible to achieve excellent static torsional strength and torsional fatigue strength. These features are found if, in the carburized shaft part, R1 is 10.0 to 30.0%, Δγ is 20% or more, etc. Further, it is proved that if treating the carburized shaft part of No. 26 of Table 4, which is carburized and quenched without forming a pilot hole in the steel material, then is machined with a hole (machining condition δ of Table 3), by carburizing it over the relatively long carburizing time (t1) of 600 minutes (heat treatment condition "d" of Table 2), in the final form of the carburized shaft part, it is possible to achieve both features of a 10.0 to 30.0% R1 and 20% or more Δγ and as a result possible to achieve excellent static torsional strength and torsional fatigue strength.

As opposed to this, as clear from Table 5, in the carburized shaft parts of the comparative examples, the chemical compositions (including C contents of surface layer parts), R1, Δγ, etc., are not controlled to within the ranges of the present invention, so it is found that the static torsional strength and torsional fatigue strength cannot both be realized at high levels. Further, in the carburized shaft part of No. 33 of Table 5 in which the steel material is carburized and quenched without making a pilot hole, then is machined with a hole (machining condition δ of Table 3), the carburizing time (t1) is a relatively short one of 120 minutes (heat treatment condition "c" of Table 2), so, for example, in the final form of the carburized shaft part, R1 is outside of the range of 10.0 to 30.0%. As a result, it is found that the static torsional strength and torsional fatigue strength cannot both be realized at high levels.

REFERENCE SIGNS LIST 11 structural observation position
12 scan electron microscope observation position
21 reference position
22 hole surface of carburized shaft part
23 hole surface of carburized material
31 plastic flow layer
32 base material
41 torsion test piece
42 test part
43 hole
44 large diameter part
45 grip part
51 deformation-induced martensite layer

The invention claimed is:

1. A carburized shaft part comprising, at a 3 mm depth from an outer circumferential surface or inside deeper than that, by mass %,
C: 0.10 to 0.30%,
Si: 0.01 to 0.30%,
Mn: 0.4 to 2.0%,
P: 0.050% or less,
S: 0.005 to 0.020%,
Cr: 0.4 to 3.5%,
Al: 0.010 to 0.050%,
N: 0.005 to 0.025%,
O: 0.003% or less, and
a balance of Fe and impurities,
optionally further comprising, by mass %,
Pb: 0.5% or less,
one or more elements selected from the group consisting of V, Nb, and Ti: 0.1% or less in total content,
one or more elements selected from the group consisting of Mo: 3.0% or less and Ni: 2.5% or less,
Cu: 0 to 0.50%, and
B: 0 to 0.020%,
satisfying formula (1) and formula (2),
having a C content of a surface layer part (Cs) by mass % of 0.60 to 1.00%,
having at least one hole at said outer circumferential surface,
having a total volume ratio (α'+γ) of martensite and retained austenite of 97% or more at a structure at a position of a 1 mm depth from said outer circumferential surface in an axial direction of said hole and at a position of a 20 μm depth from the surface of the hole,
having a maximum retained austenite volume ratio (R1) of 10.0 to 30.0% at a position of a 1 mm depth from said outer circumferential surface in an axial direction of said hole and in a range of up to a 200 μm depth from the surface of the hole, and
having a retained austenite reduction rate (Δγ) of 20% or more found by a formula (A) from said R1 and a volume ratio (R2) of retained austenite at a position of a 1 mm depth from said outer circumferential surface in an axial direction of said hole and at a position of a 20 μm depth from the surface of said hole:

$$1.54 \times C + 0.81 \times Si + 1.59 \times Mn + 1.65 \times Cr + 1.77 \times Mo + 0.63 \times Ni \geq 2.35 \quad (1)$$

$$11.3 \leq -0.1 \times Si + 15.2 \times Mn + 7.0 \times Cr + 6.7 \times Mo + 6.2 \times Ni \leq 33.8 \quad (2)$$

where, the contents (mass %) of the elements are entered in the notations of the elements in formula (1) and formula (2) and 0 is entered in the case where the elements are not included.

$$\Delta\gamma = (R1 - R2)/R1 \times 100 \qquad (A)$$

2. The carburized shaft part according to claim 1, wherein said R2 is 20% or less.

3. The carburized shaft part according to claim 1, wherein the carburized shaft part has a plastic flow layer at the surface of said hole.

4. The carburized shaft part according to claim 3, wherein said plastic flow layer has a thickness of 0.5 to 15 μm.

5. The carburized shaft part according to claim 2, wherein the carburized shaft part has a plastic flow layer at the surface of said hole.

\* \* \* \* \*